United States Patent [19]

Ueno et al.

[11] 4,207,350

[45] Jun. 10, 1980

[54] PROCESS FOR PRESERVING PROCESS CHEESE

[75] Inventors: Ryuzo Ueno, Nishinomiya; Toshio Matsuda, Itami; Shigeo Inamine, Kobe, all of Japan

[73] Assignee: Kabushika Kaisha Ueno Seiyakuoyo Kenkyujo, Osaka, Japan

[21] Appl. No.: 848,665

[22] Filed: Nov. 4, 1977

[30] Foreign Application Priority Data

Mar. 17, 1977 [JP] Japan .................. 52-28592

[51] Int. Cl.² ............... A23C 19/10; A23C 19/12
[52] U.S. Cl. .................. 426/334; 426/532; 426/582; 426/654
[58] Field of Search ........... 426/334, 582, 532, 335, 426/654

[56] References Cited

U.S. PATENT DOCUMENTS

| | | | |
|---|---|---|---|
| 2,379,294 | 6/1945 | Gooding | 424/317 X |
| 2,714,083 | 7/1955 | Ferguson, Jr. | 424/317 |
| 3,139,378 | 6/1964 | Gooding | 426/532 X |
| 3,328,176 | 6/1967 | Hansen et al. | 426/334 |
| 3,404,987 | 10/1968 | Kooistra et al. | 426/654 X |
| 3,692,534 | 9/1972 | Ueno et al. | 426/532 |
| 3,934,045 | 1/1976 | Fernholz et al. | 426/335 X |
| 4,011,346 | 3/1977 | Ernst | 426/335 X |

FOREIGN PATENT DOCUMENTS 1115231 10/1961 Fed. Rep. of Germany .
2209512 7/1974 France .

*Primary Examiner*—David M. Naff
*Attorney, Agent, or Firm*—Sherman & Shalloway

[57] ABSTRACT

A process for preserving process cheese which comprises admixing with natural cheese during the steps of preparing process cheese from natural cheese sorbic acid-containing powder or granules having particle diameter of 300 microns or more comprising 5-90% by weight of finely divided sorbic acid and 10-95% by weight of an easily water-soluble substance which is a solid at normal temperature.

2 Claims, No Drawings

PROCESS FOR PRESERVING PROCESS CHEESE

This invention relates to a novel process for preserving process cheese. More particularly, it relates to a process of improving preservability of process cheese which comprises admixing with starting material of process cheese during the steps of preparing process cheese from natural cheese sorbic acid-containing powder or granules comprising finely divided sorbic acid and an easily-soluble substance which is a solid at normal temperature. By the term "process cheese" as used in the instant specification is meant cheeses obtained by processing natural cheese such as process cheese, blended cheese, cheese spread, cheese foods thereof and so on.

Sorbic acid, as is already well known, is used as a preservative agent in many foods, and it is made clear that the lower the pH of food for the subject matter, the more remarkably the antiseptic efficacy will increase. This is because the effect with sorbic acid is brought about mainly by an undissociated form of sorbic acid. The lower the pH, the more rapidly the amount of an undissociated form of sorbic acid will increase and the more remarkably the antiseptic effect will increase. In order to effectively utilize the action as acid shown by sorbic acid itself it is very advantageous in terms of antiseptic efficacy to use sorbic acid itself. Sorbic acid, however, is sparingly soluble in water and easily water-soluble alkali metal salts of sorbic acid are frequently used in its place. It could possibly happen for a particular food, however, that in the case of using sparingly water-soluble sorbic acid the antiseptic effect is lowered rather than when using sorbate because of sorbic acid not uniformly dissolving throughout the whole.

Conventionally natural cheese is prevented from putrefraction due to the action of mold by coating or spraying the surface with concentrated aqueous solution of potassium sorbate or oil in which sorbic acid is dissolved, whereas with process cheese, viz., process cheese, blended cheese, cheese spread, cheese foods thereof and so on, it is prevented from putrefraction by admixing sorbic acid with starting material in the mixing step at the time of processing. In this, the pH is lowered by the acid action of sorbic whereby it should be expected that sorbic acid would increase its antiseptic efficacy. In the case of potassium sorbate, it is of course necessary to add 1.3 times the molecular weight of sorbic acid calculated as sorbic acid. It is economically advantageous to use sorbic acid itself. In fact, in the case of adding sorbic acid the additional amount could be saved by the difference of their molecular weights, viz., 25% less addition amount than in the case of adding potassium sorbate will suffice and, added to this, antiseptic effect with sorbic acid is higher in the efficacy. For this reason, as the preservative agent for cheese sorbic acid itself is much more frequently used than potassium sorbate.

Since sorbic acid itself irritates the human mucous membrane when dispersed and the working environment is polluted, it is conventional to use coarse powder of sorbic acid prepared by removing off scatterable fine powder from powdered sorbic acid. Sorbic acid itself is olephilic, and when added to cheese, it is considered to first dissolve in the oil and fat components of cheese. There is not a big difference in the solubility in the oil and fat components between the coarse powder and the fine powder of sorbic acid.

The instant inventors strenuously studied the process for preserving process cheese by addition of sorbic acid, with the result that they discovered the totally unexpected fact, that the effect should differ according to the way of adding sorbic acid. Process cheese comprises about 30% of oil and fat components, about 30% of protein components and about 40% of water. Process cheese has a complicated structure wherein those components are complicatedly tangled to form a body. Of these components it is the aqueous phase containing proteins but not the oil phase that takes part in the putrefraction. It is therefore important for the antiseptic effect that the preventive agent added should be contained in the aqueous phase rather than in the oil phase. Even if the amount of sorbic acid contained in the whole composition is the same, the antiseptic effect will increase with the increased amount of sorbic acid contained in the aqueous phase in which putrefraction occurs.

As already mentioned, process cheese contains a great deal of oil and fat components and oleophilic sorbic acid is imagined to first dissolve in the oil and fat components rather than in the paste-like aqueous phase containing concentrated proteins and then migrate from the oil phase toward the aqueous phase. Even with process cheese which goes through the step of stirring emulsification by application of heat at the time of manufacturing, however, the time for mixing with stirring is only about 7–10 minutes at 70° C. or thereabout or about 2–5 minutes at 80°–90° C. Obviously, the stirring conditions like that are not sufficient for the dissolution in the oil and fat components of process cheese of sorbic acid, followed by its migration toward the aqueous phase. In order to make the antiseptic effect of sorbic acid exhibit itself it is desired to make hydrophilic sorbic acid itself and dissolve directly into the aqueous phase without dissolving in the oil phase.

The instant inventors intended to make sorbic acid hydrophilic and make it more easily soluble in water than in oils and fats, and prepared sorbic acid-containing powder or granules having particle diameter of 300 microns or more comprising 5–90% by weight of finely divided sorbic acid and 10–95% by weight of an easily water-soluble substance which is a solid at normal temperature. This was admixed with natural cheese during the steps of preparing process cheese from natural cheese, with the result that there could be produced process cheese much more improved in the preservability as compared with the usual case where sorbic acid itself was admixed with natural cheese.

Sorbic acid, as hereinafter described, will completely dissolve in about 3 minutes in either case when added in stirred condition at 80° C. in water and in oil. Due to the fact, however, that the aqueous phase of natural cheese contains proteins at a high concentration and is in the condition in which it shows a high viscosity and that sorbic acid itself primarily gets on well with the oil and fat components, sorbic acid is considered to dissolve for the major part in the oil and fat components at first when added in starting material by the usual method. In the instant invention, contrary to the phenomenon like that, in order to dissolve sorbic acid directly in the aqueous phase insofar as possible there is kneaded a mixture comprising finely divided sorbic acid, an easily water-soluble substance which is a solid at normal temperature and water and/or an organic solvent, and powder or granules having particle diameter of 300 microns or more are prepared from this kneaded substance, followed by drying. Or otherwise, the kneaded substance is first dried and then powder or granules having particle diameter of 300 microns or more are prepared from this dried substance. The resultant sorbic acid-containing powder or granules dissolved rapidly in the aqueous phase but not in the oils and fats. The sorbic acid-containing powder or granules dissolve directly in the aqueous phase when added in starting material, in consequence of which process cheese prepared will be remarkably improved in the preservability.

As the easily water-soluble substances remaining solid at normal temperature in the instant invention can be used sugars such as cane sugar, grape sugar, milk sugar, fruit sugar and so on; sugar alcohols such as sorbitol and so on; organic acids such as citric acid, tartaric acid, malic acid and so on; phosphates, particularly sodium salts and potassium salts, such as primary phosphate, secondary phosphate, tertiary phosphate, polyphosphate, metaphosphate, hexametaphosphate, acid pyrophosphate and so on; organic acid salts, particularly sodium salts and potassium salts, such as citrate, malate, tartrate, sorbate and so on. However, it is not preferred to use sorbate in overly great amounts because laws and regulations impose limitations on the amount of sorbic acid added to cheese plus the amount of sorbate added as sorbic acid, and when the amount of sorbate added is made greater, it is required to lower the amount of sorbic acid added, with the result that the pH lowering effect by sorbic acid will be less. These easily water-soluble substances could be used in admixture of two members or more.

Proportions in use of these easily water-soluble substances to finely divided sorbic acid fall within the range of 10–95% by weight of easily water-soluble substances to 5–90% by weight of finely divided sorbic acid, preferably within the range of 20–90% by weight of easily water-soluble substances to 10–80% by weight of finely divided sorbic acid. The sorbic acid preparation (powder or granule) suited to the purpose of the instant invention cannot be obtained merely by mixing these easily water-soluble substances and finely divided sorbic acid. For instance, it is required to knead together by adding water or an organic solvent or mixed solution of both to a mixture of finely divided sorbic acid and easily water-soluble substances and make powder or granules from the resultant kneaded substance, followed by drying. Or otherwise, the kneaded substance may be first dried and then powder or granules made from the dried substance. Furthermore, in the case of adding water or an organic solvent, it is also possible to dissolve therein the easily water-soluble substance in advance prior to its addition. As the organic solvent there can be used methanol, ethanol, p-propyl alcohol, iso-propyl alcohol, acetone and so forth. If the easily water-soluble substance is the one which is low in the melting temperature (such as sorbitol), powder or granules could be obtained by mixing finely divided sorbic acid to that melt, followed by cooling without drying.

Particle diameter of finely divided sorbic acid is 100 microns or less, preferably 50 microns or less. If it is greater than 100 microns, the dissolution rate will become slower, which is not suited to the purpose of the instant invention.

The sorbic acid preparation of the instant invention is required to be comprised of powder or granules having particle diameter falling within the range of 300 microns or more, preferably 500 microns–1,500 microns. The preparation with particle diameter of less than 300 microns will, in part, inevitably scatter. It irritates the human mucous membrane, which in turn, causes working environment to go bad.

The instant invention will be explained in more great detail by way of working examples as follows.

EXAMPLE 1

5 kg of finely divided sorbic acid having particle diameter of 50 microns or less and 5 kg of powdered potassium citrate (monohydrate) were mixed together in a kneader. Then the mixture was kneaded with addition of 1300 ml of water. Columnar granules 0.8 mm in diameter were made from the kneaded substance obtained by means of the extrusion type granulating machine. Granules were dried to give a granulated preparation containing 50% by weight of sorbic acid.

EXAMPLE 2

A granulated preparation was prepared in the same way as in Example 1 except that there was used sodium citrate (dihydrate) in lieu of potassium citrate (monohydrate).

EXAMPLE 3

A granulated preparation was prepared in the same way as in Example 1 except that there was used citric acid (anhydride) in lieu of potassium citrate (monohydrate).

EXAMPLE 4

A granulated preparation was prepared in the same way as in Example 1 except that there was used malic acid in lieu of potassium citrate (monohydrate).

EXAMPLE 5

A granulated preparation was prepared in the same way as in Example 1 except that there was used tartaric acid in lieu of potassium citrate (monohydrate).

EXAMPLE 6

A granulated preparation was prepared in the same way as in Example 1 except that there was used sodium primary phosphate (anhydrous) in lieu of potassium citrate (monohydrate).

EXAMPLE 7

5 kg of finely divided sorbic acid having particle diameter of 50 microns or less and 4 kg of powdered sodium citrate (dihydrate) were mixed together in the kneader. The mixture was then kneaded with addition of aqueous solution prepared by dissolving 1 kg of sodium hexametaphosphate in 1,300 ml of water. By using the kneaded substance obtained there was prepared a granulated preparation containing 50% by weight of sorbic acid in the same way as in Example 1.

EXAMPLE 8

A granulated preparation was prepared in the same way as in Example 7 except that there was used acid sodium pyrophosphate in lieu of sodium hexametaphosphate.

EXAMPLE 9

A granulated preparation was prepared in the same way as in Example 7 except that there was used sodium primary phosphate in lieu of sodium hexametaphosphate.

EXAMPLE 10

Aqueous solution prepared by dissolving 2.5 kg of sodium hexametaphosphate in 2,000 ml of water was added to 7.5 kg of finely divided sorbic acid having particle diameter of 50 microns for less and thoroughly kneaded together. By using the kneaded substance obtained there was prepared a granulated preparation in the same way as in Example 1.

EXAMPLE 11

A granulated preparation was prepared in the same way as in Example 10 except that there was used potassium sorbate in lieu of sodium hexametaphosphate.

EXAMPLE 12

8 kg of powdered potassium citrate (monohydrate) was added to 2 kg of finely divided sorbic acid having particle diameter of 50 microns or less. With further addition of 1,000 ml of water the mixture was kneaded together. The kneaded substance obtained was ground by means of grinding machine, dried and then sieved to prepare a powdered preparation of 42 mesh (TYLER) - 20 mesh (TYLER).

EXAMPLE 13

2.5 kg of powdered cane sugar of 60 mesh or less was mixed to 7.5 kg of finely divided sorbic acid having particle diameter of 30 microns or less. With further addition of 1,000 ml of water the mixture was kneaded together. Columnar granules 0.8 mm in diameter were made from the kneaded substance obtained by means of granulating machine. The granules were dried to prepare a granulated preparation.

EXAMPLE 14

70 kg of sorbitol was melted by application of heat and held at 95° C. With addition of 2.5 kg of finely divided sorbic acid having particle diameter of 50 microns or less it was stirred to make a uniformly dispersed solution. Then, 0.5 kg of sorbitol powder was added and mixed as seed crystals for crystallizing melt sorbitol. After that, the mixture was cooled and crystallized. The crystallized substance obtained was ground by means of grinding machine and sieved to prepare a powdered preparation of 42 mesh (TYLER) - 16 mesh (TYLER).

EXAMPLE 15

The dissolution rate in oils and fats and in water was checked for the sorbic acid-containing granulated preparations prepared in the aforesaid Examples.

500 g of cottonseed oil was placed in a 1 l beaker and held at 80° C. While stirring by means of stirrer in such a manner as to always maintain constant conditions, sorbic acid-containing granulated preparations prepared in the aforesaid Examples were so added as to reach 0.5% as sorbic acid, followed by sampling at a proper time. Determination was made of sorbic acid dissolved in the filtrate which passed through filter paper. Measurements were made by following the same procedure of the dissolution rate in water.

The measurement results of the dissolution rate in the cottonseed oil were shown in Table 1 and the measurement results of the dissolution rate in water in Table 2.

As these Tables 1 and 2 show, the sorbic acid-containing preparations obtained by following the procedures of the aforesaid Examples are much slower in the dissolution rate in the oils and fats than sorbic acid itself and on the contrary, faster in the dissolution rate in water. It is noticed from this fact that the sorbic acid-containing preparations obtained by following the procedures of the aforesaid Examples have the property to first dissolve in the aqueous phase rather than in the oils and fats of cheese, which is extremely advantageous in terms of antiseptic effect.

Table 1

| Granulated preparation | Stirring time | | | |
|---|---|---|---|---|
| | 5 minutes % | 10 minutes % | 20 minutes % | 30 minutes % |
| Example 1 | 13.0 | 20.6 | 28.8 | 33.2 |
| Example 3 | 62.9 | 81.8 | 100.0 | — |
| Example 7 | 78.0 | 93.9 | 100.0 | — |
| Example 8 | 72.9 | 91.5 | 100.0 | — |
| Example 9 | 69.6 | 89.1 | 100.0 | — |
| Example 10 | 54.5 | 69.5 | 80.8 | 83.3 |
| Example 11 | 47.4 | 59.4 | 65.4 | 67.2 |
| | (1 minute) | (3 minutes) | (6 minutes) | |
| Sorbic acid powder (Control) | 63.0 | 98.1 | 100.0 | — |

Dissolution Rate In Cottonseed Oil

Table 2

| Granulated preparation | Stirring Time | | |
|---|---|---|---|
| | 1 minute % | 2 minutes % | 3 minutes % |
| Example 1 | 100.0 | — | — |
| Example 3 | 72.2 | 89.0 | 100.0 |
| Example 7 | 92.5 | 100.0 | — |
| Example 8 | 92.8 | 100.0 | — |
| Example 9 | 94.3 | 100.0 | — |
| Example 10 | 93.8 | 100.0 | — |
| Example 11 | 91.2 | 100.0 | — |
| Sorbic acid powder (Control) | 71.2 | 88.5 | 100.0 |

Dissolution Rate In Water

EXAMPLE 16

4 kg of minced Gouda cheese, 1 kg of cheddar cheese, 60 g of sodium secondary phosphate as an emulsifying agent and 60 g of sodium citrate were placed in a kneader heated by passing water held at 80° C. through the jacket to mix together for one minute. With further addition of preparations as indicated in Table 3 below the mixture was mixed for another 10 minutes. Whereby there was prepared process cheese. After that, it was wrapped in plastic film and left to stand at room temperature for one day. It was cooled down to room temperature and then cut off to a size of 2 cm × 3 cm × 0.5 cm. It was placed in the aseptic Schale and preserved at room temperature (20°–31° C.) to observe the condition in which it went rotten.

Results were shown in Table 3. As Table 3 shows, test runs using granulated preparations of the instant invention are obviously better in the preservability than test runs using the conventionally used potassium sorbate powder or sorbic acid powder in spite that they are the same in the addition amount as sorbic acid as well as in the pH.

Table 3

| Test Run | pH | Number of days for preservation (week) | | | | | |
|---|---|---|---|---|---|---|---|
| | | 3 | 4.5 | 6.5 | 8 | 9 | 10 |
| Potassium sorbate powder | 6.29 | − − − | − − − | ++ ++ ++ | ++ ++ ++ | +++ +++ +++ | +++ +++ +++ |
| Sorbic acid powder | 6.15 | − − − | − − − | − − − | + − − | ++ + + | ++ + + |
| Sorbic acid-containing granulated preparation (Example 1) | 5.99 | − − − | − − − | − − − | − − − | − − − | − − − |
| Sorbic acid-containing granulated preparation (Example 2) | 6.16 | − − − | − − − | − − − | − − − | − − − | − − − |

| Test run | pH | Number of days for preservation (week) | | |
|---|---|---|---|---|
| | | 11.5 | 13 | 16 |
| Potassium sorbate powder | 6.29 | +++ +++ +++ | +++ +++ +++ | not measured |
| Sorbic acid powder | 6.15 | ++ ++ ++ | ++ ++ ++ | +++ +++ +++ |
| Sorbic acid-containing granulated preparation (Example 1) | 5.99 | − − − | − − − | − − − |
| Sorbic acid-contaning granulated preparation (Example 2) | 6.16 | − − − | + − − | + + − |

−; indicates no changing
+, ++, +++; indicate the degree to which petrefaction occurred.

EXAMPLE 17

3 kg of minced Gouda cheese (ripeness 3 months) and 2 kg of cheddar cheese (ripeness 10 months) were placed in a mixer through the jacket of which water held at 80° C. was passed. With addition of 60 g of sodium secondary phosphate (dodeca hydrate) and 60 g of sodium citrate (dihydrate) the mixture was mixed for one minute. After that, with addition of preparations as shown in Table 4 the mixture was mixed for another 10 minutes to make process cheese. Then, it was wrapped in plastic film and left to stand at room temperature for one day. It was cooled and then cut off to a size of 2 cm×3 cm×0.5 cm. It was placed in the aseptic Schale and preserved at 25° C. to observe the condition in which it became rotten.

Results, as Table 4 shows, indicate that test runs using the granulated preparations of the instant invention should be obviously excellent.

Table 4

| Test Run | pH | Number of days for preservation (week) | | | | |
|---|---|---|---|---|---|---|
| | | 1 | 2 | 3 | 4 | 5 |
| Non-prepa- | 5.91 | +++ +++ +++ | Not measured | Not measured | Not measured | Not measured |
| Potassium sorbate powder 0.268% (0.20) | 5.90 | − − − | − − − | − − − | − − − | + − − |
| Sorbic acid powder 0.20 (0.20) | 5.76 | − − − | − − − | − − − | − − − | − − − |
| Sorbic acid powder 0.10 (0.10) | 5.79 | − − − | − − − | − − − | + + + | ++ ++ ++ |
| Sorbic acid-containing granulated preparation Example 1) 0.40 (0.20) | 5.72 | − − − | − − − | − − − | − − − | − − − |
| Sorbic acid-containing granulated preparation (Example 1) 0.20 (0.10) | 5.80 | − − − | − − − | − − − | − − − | − − − |

Number of days for preservation (week)

Table 4-continued

| Test run | pH | 6 | 7 |
|---|---|---|---|
| Non-preparation | 5.91 | Not measured | Not measured |
| Potassium sorbate powder 0.268% (0.20) | 5.90 | + + − | + + − |
| Sorbic acid powder 0.20 (0.20) | 5.76 | − − − | − − − |
| Sorbic acid powder 0.10 (0.10) | 5.79 | ++ ++ ++ | +++ +++ +++ |
| Sorbic acid-containing granulated preparation (Example 1) 0.40 (0.20) | 5.72 | − − − | − − − |
| Sorbic acid-containing granulated preparation (Example 1) 0.20 (0.10) | 5.80 | + − − | + − − |

−;indicates no changing
+, ++, +++;indicate the degree to which putrefraction occurred

What we claim is:

1. In a process of preparing process cheese having a protein-containing aqueous phase and a fat-containing oil phase from natural cheese in which a sorbic acid preservative is admixed with natural cheese, during processing of the natural cheese to form the process cheese, the improvement which comprises, using as the sorbic acid preservative, a sorbic acid preparation in the form of particles having a diameter of 300 microns or more, each particle of said preparation comprising 5–90% by weight of finely divided sorbic acid particles having a diameter of 100 microns or less and 10–95% by weight of an easily water-soluble substance which is solid at room temperature selected from the group consisting of sugars, sugar alcohols, organic acids, organic acid salt and phosphates, said sorbic acid preparation being substantially completely dissolved in the protein-containing aqueous phase of the process cheese, wherein said sorbic acid preparation is prepared from a mixture comprising the finely divided sorbic acid, easily water-soluble substance which is solid at normal temperature and a member selected from the group consisting of water and organic solvent or mixture of water and organic solvent, said mixture being formed into particles having a particle diameter of 300 microns or more followed by drying said particles or said mixture being dried and then formed into particles having a particle diameter of 300 microns or more.

2. The process of claim 1 in which the sorbic acid preparation has a particle size in the range of about 500 to 1500 microns and comprises about 20–90% by weight of the easily water-soluble substance and about 10–80% by weight of the finely divided sorbic acid having a particle diameter of 50 microns or less.

* * * * *